United States Patent
Ciliberti, Jr.

[11] 3,784,411
[45] Jan. 8, 1974

[54] ELECTRIC CELL BATTERY WITH PLASTIC WEBBING SPACER FOR FAST AND COMPLETE EPOXY ENCAPSULATION

[75] Inventor: Frank Leonard Ciliberti, Jr., Ossining, N.Y.

[73] Assignee: P. R. Mallory & Co., Inc., Indianapolis, Ind.

[22] Filed: July 6, 1971

[21] Appl. No.: 159,933

[52] U.S. Cl.................. 136/87, 136/110, 136/132, 136/171
[51] Int. Cl..................... H01m 23/00, H01m 21/00
[58] Field of Search................ 136/110, 111, 132, 136/145, 146, 166, 87, 133; 264/257, 274; 161/88, 89

[56] References Cited
UNITED STATES PATENTS

| | | | |
|---|---|---|---|
| 1,907,303 | 5/1933 | Peterson | 264/274 |
| 2,315,592 | 4/1943 | Cargill | 136/166 |
| 2,894,053 | 7/1959 | Louzos | 136/87 |
| 3,216,864 | 11/1965 | Bushrod et al. | 136/146 |
| 3,510,359 | 5/1970 | Selover et al. | 136/146 |
| 3,617,593 | 11/1971 | Alderfer | 264/257 |

Primary Examiner—A. B. Curtis
Assistant Examiner—H. A. Feeley
Attorney—Robert Levine

[57] ABSTRACT

A cell spacer consisting of a grid of polypropylene filaments, providing a non-friction, non-wetting spacer for cells in a container, with free runways in spacer, and three-dimensional adjustability of spacer to permit epoxy flow along, around and under spacer to form complete epoxy closure, and battery made with such spacers, and method of epoxy flow control.

15 Claims, 5 Drawing Figures

PATENTED JAN 8 1974

3,784,411

INVENTOR.
Frank L. Ciliberti
BY
Robert Lewis
ATTORNEY

ELECTRIC CELL BATTERY WITH PLASTIC WEBBING SPACER FOR FAST AND COMPLETE EPOXY ENCAPSULATION

This invention relates to batteries and particularly to an improved insulating structure in a battery in which cells are arranged in one or more stacks and assembled in a box or container, with suitable initial insulating separators around each stack of cells, to enable highly effective encapsulation to be achieved to isolate the stack from its container or from an adjoining stack, and also to insulate the cells from each other.

In the manufacture of a small portable multiple cell battery, the cells are first assembled in stacks. For example, three in a stack, for a small battery of 4.5 volts. In a larger battery, the stacks are assembled side by side in one box or container, and a thermo-setting plastic resin, such as an epoxy, in fluid condition at elevated temperature, is poured into the box or container to flow into the spaces around and between the cells, to form and constitute a complete insulation covering and barrier to prevent leakage bridging between the cells in the assembled battery.

Present conventional methods of assembly of a multi-cell battery utilize cardboard tubes with perforated walls for encircling each stack of cells, to provide initial separation and insulation spacing between the individual stacks, and then thermo-setting insulation, such as epoxy in liquid form, is poured into the spaces between the cells, to provide final and complete insulation between the cells when the thermo-setting epoxy finally cures and hardens, after a suitable curing time specific to the epoxy mixture.

An ideal battery construction would provide complete coverage of the epoxy over each cell, so that any leakage that might occur in any one of the cells would be confined to the immediate region occupied by the leaking cell, so the leaking electrolyte would not be permitted to bridge the gap between the leaking cell and one of the adjacent cells, thereby to cause a short circuit between cells. Such a short-circuit would drain all of the cells included in the local circuit of the bridging electrolyte and the permanent circuit connections between cells.

The leakage from a cell is of course a recognized problem. Efforts to improve sealing of a cell are unending. Nevertheless, with all of the continued improvements in the sealing of cells, conditions do occur that cause leakage, and it is to limit harmful effects of such leakage towards which this invention is directed, to prevent the effective destruction of a battery and thereby increase shelf life of batteries held in inventory and waiting to be put into use, or even after a battery has been put into use and leakage caused by the working conditions could diminish the life of the battery.

Therefore to overcome the effects of the leakage, as the problem to be solved, this invention is directed to the provision of a new and improved construction of a battery, by providing and disposing a new spacing insulation between adjacent stacks, that will enable the encapsulating epoxy, in liquid form at high temperature, to flow readily between a cell and the space occupied by the structure between cell stacks.

In the present invention, in order to establish a condition for permitting free flow of the liquid epoxy around the cells, a suitable spacer is provided that has no tendency to absorb any of the epoxy as it flows and that will therefore permit the epoxy to flow freely throughout and into the volumetric space which the epoxy is to fully fill.

The spacer is a webbing of insulating material, here a plastic, having a substantially self-lubricating surface so there is a minimum resistance to the flow of the epoxy, that might otherwise be frictionally impeded as it flows to fill entirely the open space around the respective cells.

The webbing used for the present purpose is preferably arranged with all of a bottom set of parallel ribs disposed in parallel and in spaced relation on a virtual cylinder, with a second set of upper ribs arranged also in parallel spaced arrangement but transverse to the bottom ribs, to occupy a virtual locus of a superimposed cylinder. Thus, the two sets of spaced ribs are angularly disposed with respect to each other, but each set presents open free flowing passages between ribs for a liquid epoxy to flow freely along the passages and also into the interstices of the two cylindrical planes. Moreover, the webbing is made of polypropylene and is relatively soft and deformable, especially as a rib or filament.

The liquid epoxy, with its surface tension against the outer surface of a cell, can seep under the webbing ribs and flow along the surface of the cell casing.

Thus, the liquid epoxy in its free flow can and does move to engage and surround the outer surface of each cell.

Further, the liquid epoxy fills its intended space in a minimum of time, thereby accomplishing fast filling operations during manufacture.

The invention thus has several advantages and features that provide a better battery, and also advantages in manufacture.

One object of the invention is to provide a novel spacer to encircle a cell and permit easy flow of an encapsulating thermo-plastic resin around and through said spacer.

Another object of the invention is to provide a spacer between stacks of cells for surrounding and isolating each stack to provide better insulation between the stacks of a multi-stack battery.

Another object of the invention is to provide a spacer for surrounding and isolating a stack of cells, which will permit freer and fuller flow of an epoxy resin into surface engagement with each cell to provide for better insulation characteristics in subsequently confining any leakage from any cell to the space immediately surrounding that cell, and to thereby prevent any leaking electrolyte from seeping over to an adjacent stack and serve to cause a short circuit of cells included in the loop bridged by such leakage electrolyte.

Another object of the invention is to provide a spacer having relatively no frictional surface characteristics, whereby a liquid thermoplastic resin is enabled to flow freely along the surface of such spacer material without impediment and limited only by the liquidity of the epoxy resin.

Another object of the invention is to provide a spacer of plastic material in the form of a webbing with parallel filaments co-planar to define free passages between them to permit free flow of a fluid encapsulating resin, and that will tolerate a high temperature in the epoxy resin that is introduced into the space around the cell stacks, thereby permitting the use of a fluid resin at an elevated temperature for maximum freedom in flowing and in a minimum of consumed time, whereby the manufacturing operation of assembling a battery is expedited.

Another object of the invention is to provide a greater economy and speed in manufacturing a battery which has at the same time improved quality in that it is less likely to be drained by short circuiting leakage that might develop from any of the cells.

Another object of the invention is to provide for a battery that will have greater shelf life by limiting and preventing leakage from bridging between cells while a battery is waiting in inventory to be used.

The general details of construction of the battery constructed in accordance with the principles of this invention are described in more detail in the following specification, taken together with the accompanying drawings, in which FIG. 1 is a front elevational view of a cylindrical webbed spacer as utilized and employed in this invention;

Figure 1:
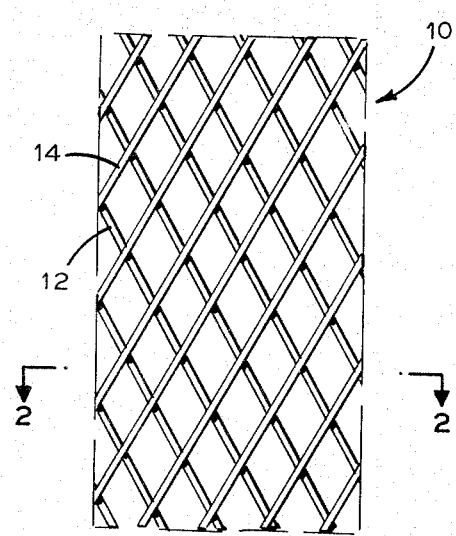
Figure 3:
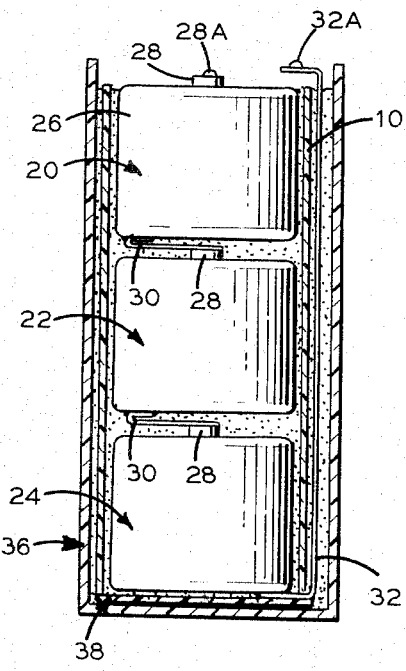
Figure 4:
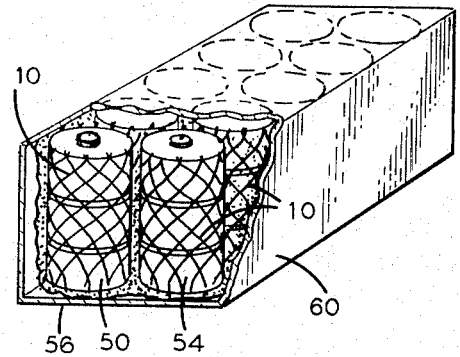

FIG. 3 is a front elevational view of a battery of a stack of cells shown in a group of three, concentrically disposed in a cylindrical webbed spacer, such as shown in FIG. 1, and illustrates the disposition of a spacer along the full length of a stack, with an electrode terminal conductor shown connected to the outer jacket electrode of the bottom cell, and brought up outside of the webbed spacer to a top level of the top cell; and FIG. 4 is a perspective view of a multi-stack battery to illustrate the disposition of two adjacent stacks in a battery containing several such stacks.

As previously indicated, one of the major continuing problems in the manufacture of electric cells of the alkaline electrolyte type, is the difficulty in effecting a perfect seal to prevent any leakage of the electrolyte. In the case of an individual cell battery, a leakage condition may be visible, so that a suspicion of a defective battery may be readily checked. However where several cells, or stacks of cells are combined in a larger battery and and the cells are adjacently disposed, even though encapsulated, if the encapsulation is merely good as a spacer but not adequate as a barrier, the leakage from any cell may bridge across to the metal casing of an adjoining cell and thus cause a short-circuit of one or more cells within the loop closed by the bridge of the conductive leakage, and the battery may become defective without any indication of that condition on the outside of the battery.

Thus, even though every cell individually can not be completely and positively sealed, it becomes just as important to prevent leakage from a cell from becoming a conducting bridge to another cell, that would cause internal short-circuits to the battery. The problem in such a case therefore more than merely leakage, becomes one of inadequate encapsulation. Therefore, a leakage from any one cell should be confined, and prevented from spreading as a conducting bridge to an adjacent cell, since it would thereby serve to establish and cause a short-circuit.

Thus, this invention is directed to a better solution of the problem of encapsulation, with more effective insulating enclosure of each cell.

To provide an effective insulating enclosure and insulating isolation of each, an ideal solution requires that the encapsulating material should form a completely closed enclosure of the cell and those portions of the cell from which leakage might occur. The problem then becomes one of achieving, ideally, complete access of the encapsulating material to all of the surfaces of an electric cell which should be enclosed by the protective insulating closure of encapsulating material to prevent any leakage from travelling from one cell to an adjoining cell.

Encapsulating material is ordinarily applied in fluid form at an elevated temperature, so that it will be free flowing and able to penetrate and flow into narrow passages, which must be suitably vented of course to enable the liquid insulating and encapsulating material to enter freely without restraint.

In order to provide the proper flow space for the encapsulating liquid around the cells, or stacks of cells, as located within an outer housing or packaging, various types of spacing elements have been employed to hold cells or stacks in appropriate position, spaced from the housing, so that the encapsulating material could flow between the cells and the housing to provide the insulation desired around the cell or cells.

Spacing materials as now conventionally used, introduce problems, because they do not permit free flow of encapsulating fluid and do not permit free easy and full access of the encapsulating fluid material to the entire surfaces of the cells, or stacks of cells, that are to be safeguarded and covered to prevent intercellular leakage.

The present invention is intended to solve those problems by providing spacers of a particular form and of particular physical characteristics, that will enable and permit the spacer to act as a non-restrictive guide to guide the fluid encapsulating material in free passages, as free flowing substreams, to flow freely without any impediment or restrictions, with the added feature that the spacer is easily deformable and shiftable by the liquid encapsulating epoxy to enable the epoxy to seep under the spacer and engage the entire metal surface of a cell to form a closed form around a cell.

This invention generally employs a cylindrical plastic web spacer of polypropylene, to surround one or more cells to establish an air space around the cells into which a thermoplastic encapsulating material in fluid phase may be flowed for curing and hardening as ultimate rigid encapsulation. Such plastic spacer 10 has an inner set of parallel ribs 12, disposed on a virtual cylinder with preferably regular arcuate spacing between the ribs, and has a second set of upper or top ribs 14, also disposed parallel and with relatively uniform arcuate spacing, and arranged transversely to the lower set of ribs 12, in grid form to hold those lower ribs 12 in a generally fixed relationship. Both sets of ribs 12 and 14 are arranged to have a generally longitudinal disposition, although disposed at an angle to each other and to the longitudinal dimension of the spacer.

The propylene material of which the spacer is formed has a smooth soapy feeling and is relatively non-frictional, and, in addition, is substantially non-wetting.

Figure 2:
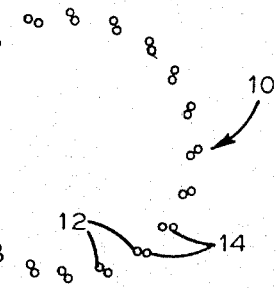
FIG. 2 is a transverse sectional view taken along the line 2—2 of FIG. 1, and illustrates the arrangement of the ribs of the webbing in two cylindrical superposed groups.
Figure 2A:
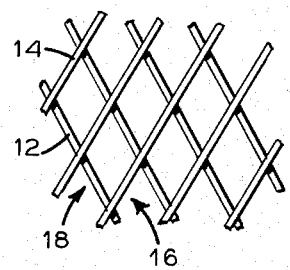
FIG. 2A is a plan view of a flat portion of the spacer of FIG. 1.

As shown in the small developed flat section in FIG. 2A, the inner parallel ribs 12 define free unimpeded passages 16 between adjacent ribs, and along the length of those ribs 12. Consequently when the cylindrical web spacer 10 is placed in position as a cylinder, as in FIGS. 1 and 3, the passages 16 provide free open paths for the encapsulating material that may readily flow into and along those passages to assume ultimate position to form the encapsulation.

The upper set of ribs 14 similarly defines running passages 18 that are unimpeded along the full length of the spacer and thus provide free passages for the liquid encapsulating material to flow along those passages 18.

The cells considered here generally have an open circuit voltage of 1.5 volts. They are sold commercially as individual cells which have their own construction that is not immediately relevant to this invention, except that under certain conditions where high heat operating conditions are developed, or under certain conditions while the cells are sitting waiting on a shelf to be used, thermal cycles may develop internal pressures in a cell which will cause a leak, notwithstanding the many excellent structures for sealing the cells to protect against any such leakage.

The present invention is utilized in combination with stacks of cells, or with groups of stacks of cells for batteries of various voltages. As shown in FIG. 3, one stack of three cells is shown which may be employed in a battery to supply 4.5 volts. In FIG. 4 is indicated a size of battery which will employ, for example, ten stacks of the kind shown in FIG. 3, for the purpose of providing a battery voltage of 45 volts.

A shown in FIG. 3, a stack of cells is assembled including three cells 20, 22 and 24. These cells are indicated to be of the alkaline type indicated schematically as including an outer metallic casing 26, which also constitutes the cathode element of the cell and may be utilized for connection as such to an external circuit. The anode of such a cell generally constitutes and here is indicated to be a central co-axial electrode 28. The three cells 20, 22 and 24 of the stack are assembled in superimposed position co-axially.

For full maximum reliability series circuit operation, the cathode jacket of an upper cell is electrically connected to the anode electrode of an immediately lower cell by a suitable electrical conductor 30 which during manufacture is welded at one end to the jacket of the upper cell and is welded at the other end to the anode connection of the lower cell. The cathode jacket of the bottom cell 24 has welded thereto an elongated terminal conductor 32, which is welded onto the outer jacket 26 of the cell 24 and continues upward along the length of the stack to a level at which the upper end of the terminal conductor 32 is suitably supported and provided with a terminal 32A for subsequent connection to an external circuit. In the same manner the anode 28 of top cell 20 is provided with a terminal 28A for connection to such external circuit.

Where the single stack in FIG. 3 is to be used as a battery of 4.5 volts, the insulating webbed spacer 10 is disposed around the stack of three cells after the inter cell connections have been welded, so that the stack of cells may be conveniently compressed into superimposed seating. For clarity of illustration, the cells 20, 22 and 24 are shown spaced, and not fully compressed in the stack. The stack is then placed in its spacer 10 and the assembly of cells and spacer with the external longitudinal conduit 32 is inserted into the box or housing 36, within which the stack of cells is to be encapsulated with a suitable insulating material such as an epoxy resin.

In order to provide a suitable space for the liquid epoxy resin to flow into to encapsulate the bottom of the stack, a flat circular disc 38 of the webbing material similar in construction to the basic web material 10, is first placed at the bottom of the container or housing 36 before the stack of cell is introduced.

After the stack of cells together with the cylindrical and bottom webbed spacers 10 and 38 have been disposed in the case 36, a suitable thermo-setting resin, in liquid condition at an elevated temperature, is poured into the case 36 until all of the air within the case and around the cells has been forced out and replaced by the liquid encapsulating material. After suitable curing and hardening time, as controlled by the ingredients of the encapsulating material, and the conditions of the curing environment, the thermosetting resin gradually cures and hardens to its ultimate solidified condition.

In the interest of economical manufacture, the nature of the manufacturing operation is such that a minimum of time should be required and be sufficient for the filling of the case 36 to express the air and to introduce the encapsulating material and to enable it to flow quickly to its ultimate position around the spacer, where it will form the insulating enclosure, around the individual cells of the stack, and around the entire stack. It is in connection with certain steps of manufacturing operation that certain features of the invention are of advantage, as previously mentioned in describing FIG. 2A. The running passages 16 and 18, between the ribs of each of the two respective sets 12 and 14, provide free open spaces as passages for the flow of the liquid encapsulating material. As a result, that encapsulating material may flow freely and quickly to fill the vacant air space within the box 36 and to express all the air initially in that space, between the several cells and the enclosing box 36.

Other features of importance that contribute to the free and rapid flow of encapsulating material, are the non-frictional and non-wetting characteristics of the surface of the material of the spacer. Since there is practically no resistance encountered along those surfaces as the liquid encapsulating epoxy material is introduced, that epoxy material may flow freely and quickly to fill the air space and take its ultimate position.

Another feature of importance is the relative softness and deformability of the polypropylene material, of which the spacer is made. The individual ribs of the spacer are thin filaments, about 0.025 to 0.030 of an inch in diameter. The webbing is thus relatively soft and expandable, and is also both easily and readily deformable. In one construction of the spacer used for the smaller cells, the width of the runway passages 16 and 18 between adjacent ribs in a representative outside spacer is about 0.10 inch, which is a relatively wide and free passage for a liquid encapsulating material at elevated temperature to traverse.

The special feature which this easily deformable structure provides, is that substreams of the encapsulating liquid, flowing into adjacent passages 16, for example, in FIG. 2A, will tend to flow together and coalesce, because of the surface tension of the encapsulating liquid with the surface of the metal jacket of the electric cell, while those sub-streams are completely free of any resistive frictional impedance from the ribs 12, as the encapsulating liquid tends to squeeze and seep under the ribs 12. Consequently, the encapsulating fluid tends to flow together to form ultimately a continuous cylindrical layer, or structural body, of encapsulating material. Consequently, if any cell should develop a leak, the leaking electrolyte is confined in the enclosing encapsulating structure, and the leaking electrolyte is thereby prevented from seeping over to engage the surface of another cell, which might thereby cause a short circuit.

In a battery where several stacks are combined, as shown by way of illustration in FIG. 4, each stack of cells, such as stacks 50 and 52 in FIG. 4, is provided with its own cylindrical separator 10. A bottom separator 56 is provided as a common separator for the entire box container 60 for the several stacks of cells, or each individual stack 50, 54 may be provided with its own bottom flat disc separator, corresponding to separator 38 in FIG. 1. In either case, the operation of the webbing materials is such as to provide the features and advantages heretofore referred to, namely to provide free open passages for free unimpeded flow of the liquid encapsulating material, and to permit seepage between the ribs of the spacer elements whether in the cylindrical form surrounding the stacks or in the flat form, to provide a floor spacer for the cells in stacks, when assembled in unit batteries or in multi-stack batteries.

Thus the invention as herein disclosed includes the use of a special form of webbing which permits extremely free flow of fluid encapsulating material in an assembled cell, and includes also the method of forming and assembling such a cell, in order to enable the more rapid operation of filling a battery with encapsulating material, and to permit the formation of an encapsulating structure that engages the entire surface of the cell that is to be isolated and insulated, together with the advantages of a final battery structure in which individual cells or stacks of cells are so isolated by the insulating encapsulating material as to prevent intercellular seepage that would be a conductive branch to establish a short circuiting connection that would deplete the short-circuited cells and destroy the effectiveness and value of the battery.

The invention is not necessarily limited to the specific details of structure or arrangement that are here shown since those may be variously modified without departing from the spirit and scope of the invention, as described in the claims.

What is claimed is:

1. An electric cell battery comprising:
a plurality of electric cells electrically joined together to constitute a stack, each cell embodying an enclosing jacket;
an outer housing surrounding said cells;
a spacer of non-rigid insulating material formed as a tubular web structure to be slid over said stack of cells to constitute a generally concentric cylindrical spacer between said cells and said housing, said spacer constituting a mesh having filaments disposed in two directions with all filaments in one direction co-planar, and all filaments in a transverse direction co-planar;
a filling of thermo-setting insulating materials within the space around said spacer to form a closed cylinder around said cells.

2. An electric cell battery, as in claim 1, in which said spacer embodies a web having parallel ribs disposed in arcuately spaced relation around the cell jacket to define parallel running spaces having substantial longitudinal space components to permit an introduced fluid insulating thermo-setting material to flow freely in sub-streams along said spaces, and there join to form a cylinder of insulation to enfold said cell jacket.

3. An electric cell battery, as in claim 1, in which said spacer is formed of a plastic material and has three-dimensional adjustability relative to an adjacent cell.

4. An electric cell battery, as in claim 2, in which said spacer is formed as a web structure, with said parallel ribs arranged in a cylindrical plane as a bottom layer, and held in position by an overlayer of parallel spaced ribs, angularly disposed relative to the bottom ribs.

5. An electric cell battery, as in claim 4, in which said spacer is formed as a web structure of polypropylene material.

6. An electric cell battery, as in claim 5, in which said spacer constitutes and functions as an expansible tubular web structure for fitting over cells of different diameters.

7. An electric cell battery, as in claim 5,
including multiple stacks of cells, adjacently disposed in side-by-side relation, with a spacer web fitting lengthwise over each stack;
and a filling of thermo-setting material filling the running spaces between parallel ribs to constitute a thermoset structure locked in the interstices of the webs to constitute a complete filling of thermoset insulating material engaging and encapsulating the cells within the housing.

8. An electric cell battery, as in claim 1, in which said spacer consists of a web structure with free running spaces formed lengthwise of said web and transverse running spaces to define interstices with said lengthwise spaces to receive and hold locking keys of a thermosetting encapsulating material.

9. An electric cell battery, as in claim 1, in which said spacer is of a material that is relatively frictionless and non-wetting to a flowing fluid thermosetting plastic material, and said spacer serves in place as a frictionless guide for the fluid thermosetting material as said material flows into ultimate position to fill intended space surrounding the several cells of the battery.

10. An electric cell battery, as in claim 1, in which said spacer embodies a series of parallel spaced ribs surrounding each cell and defines unimpeded free flow paths in the spaces between said ribs, said spacer ribs being of a material that is non-wetting to the epoxy used therewith, and that is easily and readily deformable, so the fluid epoxy will flow freely in said space paths and also freely under said ribs to wet and cover the outer surface of the outer jacket of the cell under the spacer ribs, whereby a complete epoxy cylinder is formed around each cell, to prevent any cell leakage from becoming an intercell short-circuiting bridge.

11. An electric cell battery, as in claim 1, in which said spacer consists of a webbed structure of filaments or ribs of insulating material that is non-wetting and easily deformable, whereby said thermosetting material in fluid form at elevated temperature will flow freely along said filaments or ribs, and will also flow freely around and under said filaments or ribs to engage the surface of said enclosing jacket around said cell and will also creep in sub-stream along said jacket surface due to surface tension, and will thereby raise the easily deformable filaments or ribs sufficiently to enable the freely flowing and creeping thermosetting fluid to join and coalesce with other similarly flowing and creeping sub-streams to form an ultimate continuous cylinder enclosing a cell and constituting a complete barrier against leakage from said cell bridging over to another cell.

12. An electric cell battery, as in claim 5, in which
a top cell in said stack has a top central electrode exposed to serve as a first terminal for connection to an external circuit;
and lower cells are serially electrically connected in a manner to permit the cells to be stacked in close physical engagement axially;
and said spacer is concentrically disposed around said cells along the length of said stack of cells;
and a conductor is suitably bonded to the outer casing or terminal of the bottom cell of said stack and disposed along the length and along the outside of said spacer to a level adjacent the top of said stack, to serve as a second terminal of said stack for connection to an external circuit.

13. A battery, as in claim 1, in which
said spacer has three-dimensional adjustability characteristics that will enable said spacer to snugly conform to the surrounding structure while permitting the liquid thermosetting epoxy material to flow freely into and through interstices in said spacer.

14. In an electric battery containing one or more electric cells, each of said cells embodying an enclosing jacket and a cylindrical spacer consisting of a polypropylene grid mesh surrounding each cell thereof, said mesh having filaments disposed in two directions, with all filaments in one direction co-planar, and all filaments in a transverse direction co-planar.

15. In a battery assembly comprising a plurality of jacketed electric cells contained within an outer housing, a cylindrical insulating member therefor separating said housing from said cells, said insulating member consisting of a tubular grid of polypropylene filaments with the filaments disposed in two directions, with all filaments in one direction co-planar, and all filaments in a transverse direction co-planar, to thereby provide free runways in said insulating member to allow an insulation to be poured between said cells and said housing to impregnate same to form a composite of grid and sheath to form a complete insulating closure for said assembly.

* * * * *